United States Patent
Jones et al.

(10) Patent No.: US 11,316,890 B2
(45) Date of Patent: Apr. 26, 2022

(54) NETWORK DENIAL OF SERVICE DEFENSE METHOD AND SYSTEM

(71) Applicant: LATCH SYSTEMS, INC., New York, NY (US)

(72) Inventors: Michael Brian Jones, New York, NY (US); Saayuj Dhanak, New York, NY (US); Deepthi Gandhi, Hoboken, NJ (US); Harikrishnan Nair, New York, NY (US); Adam Incera, New York, NY (US)

(73) Assignee: LATCH SYSTEMS, INC., New York, NY (US)

( * ) Notice: Subject to any disclaimer, the term of this patent is extended or adjusted under 35 U.S.C. 154(b) by 187 days.

(21) Appl. No.: 16/514,676

(22) Filed: Jul. 17, 2019

(65) Prior Publication Data

US 2021/0021635 A1 Jan. 21, 2021

Related U.S. Application Data

(60) Provisional application No. 62/874,746, filed on Jul. 16, 2019.

(51) Int. Cl.
*H04L 29/06* (2006.01)
*H04W 12/12* (2021.01)
*H04W 12/122* (2021.01)

(52) U.S. Cl.
CPC ...... *H04L 63/1458* (2013.01); *H04L 63/0853* (2013.01); *H04L 63/101* (2013.01); *H04L 63/1433* (2013.01); *H04W 12/12* (2013.01); *H04W 12/122* (2021.01)

(58) Field of Classification Search
CPC ............. H04L 63/1458; H04L 63/0853; H04L 63/101; H04L 63/1433; G06F 21/50; G06F 21/55; G06F 21/554; H04W 12/12; H04W 12/122
See application file for complete search history.

(56) References Cited

U.S. PATENT DOCUMENTS

| | | | |
|---|---|---|---|
| 6,886,102 B1 * | 4/2005 | Lyle | G06F 21/554 709/206 |
| 9,437,063 B2 | 9/2016 | Schoenfelder et al. | |
| 9,666,000 B1 | 5/2017 | Schoenfelder et al. | |
| 10,083,559 B2 | 9/2018 | Schoenfelder et al. | |
| 2009/0068946 A1 * | 3/2009 | Amendola | H04W 12/126 455/41.2 |
| 2010/0039220 A1 * | 2/2010 | Davis | G06F 21/31 340/5.52 |
| 2015/0188935 A1 * | 7/2015 | Vasseur | G06N 20/00 726/23 |
| 2016/0049024 A1 * | 2/2016 | Johnson | H04W 4/029 340/5.7 |
| 2018/0336747 A1 | 11/2018 | Schoenfelder et al. | |

* cited by examiner

*Primary Examiner* — Edward Zee
(74) *Attorney, Agent, or Firm* — Kacvinsky Daisak Bluni PLLC (57) ABSTRACT

Systems and methods are described for protecting a device from a denial of service (DOS) attack. The method comprises receiving, by the device, a connection request from a third-party device, determining, by the device, that the third-party device is malicious. Switching a mode of operation of the device from a first mode to a second mode, in response to determining that the third-party device is malicious, and broadcasting in the second mode, a message configured to be decoded only by a credentialed device.

20 Claims, 5 Drawing Sheets

NETWORK DENIAL OF SERVICE DEFENSE METHOD AND SYSTEM

CROSS-REFERENCE TO RELATED APPLICATIONS

This application claims the benefit under 35 U.S.C. 119(e) to U.S. Provisional Application No. 62/874,746, entitled "NETWORK DENIAL OF SERVICE DEFENSE METHOD AND SYSTEM," filed on Jul. 16, 2019, the contents of which are incorporated by reference herein in their entirety.

TECHNICAL FIELD

The present disclosure relates to systems and methods for securing an Internet of Things (IOT) device against a Denial of Service (DOS) attack, and more specifically to systems and methods for determining that the IOT device is under a DOS attack and broadcasting an SOS message in response to the attack.

BACKGROUND

IOT devices have become ubiquitous in homes and often control critical functions of people's homes, such as thermostats, lights, and door locks. Because IOT devices are accessible via various networks, these devices are susceptible to DOS attacks from malicious devices. For example, the Bluetooth channel of a Bluetooth-enabled door lock can be occupied by a malicious device that repeatedly and persistently connects or attempts to connect to the IOT device, thus preventing legitimate users from connecting to the door lock with their smartphones to lock or unlock the door.

SUMMARY

Systems and methods for protecting a device from a denial of service (DOS) attack are provided.

According to aspects of the invention, an exemplary device receives, a connection request from a third-party device. The device determines, that the third-party device is malicious. The device switches a mode of operation of the device from a first mode to a second mode, in response to determining that the third-party device is malicious, and broadcasts, by the device in the second mode, a message configured to be decoded only by a credentialed device.

According to alternative embodiments of the invention, determining that the third-party device is malicious further comprises determining, whether the connection request from the third-party device does initiates or not a legitimate authentication, and dropping, a connection with the third-party device in response to determining that the connection request does not begin a legitimate authentication.

According to alternative embodiments of the invention, the device determines that the number of connection attempts by the third-party device have exceeded a threshold, and determines that the third-party device is malicious, when the number of connection attempts has exceeded the threshold. According to alternative embodiments of the invention, the device is accessible over a local area network or personal area network mode in the first mode of operation. According to alternative embodiments of the invention, in the second mode of operation the device is not accessible over the local area network or personal area network and is configured to broadcast only the message.

According to alternative embodiments of the invention, the device is an internet-of-things (IOT) device, wherein the IOT device is an access control device, that is used to control access to a building. According to alternative embodiments of the invention, the credentialled device is a mobile device that receives credentials from the device to enable the credentialled device to provide access to the building.

BRIEF DESCRIPTION OF DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

According to embodiments of the present disclosure, systems and methods are disclosed that enable an IOT device to detect and protect itself from a malicious device that can compromise the security of the IOT device. IOT devices are generally commonplace devices that historically could not connect to a network, but now they can. In some embodiments, the IOT devices can connect to networks such as the Internet, BLUETOOTH®, ZIGBEE®, Near-Field Communication (NFC), infrared transmission networks, cellular networks, or other wireless or wired networks.

Typically, DOS attacks bombard servers with unauthentic requests and communications to block legitimate requests from reaching the server. Similarly, in the case of IOT devices, malicious devices that are connected to the same network as the IOT device can bombard the IOT device with malicious requests, for example, through the local-area network protocol. This local DOS attack through a local-area network protocol can cause two problems. First, the malicious device can occupy the local-area network protocol channel for the IOT device, thus not allowing any legitimate devices to connect to it. Additionally, repeatedly and persistently connecting to an IOT device which is battery powered, can drain the IOT device of its power, thus causing it to fail faster than under normal battery drainage and usage conditions.

Figure 1:
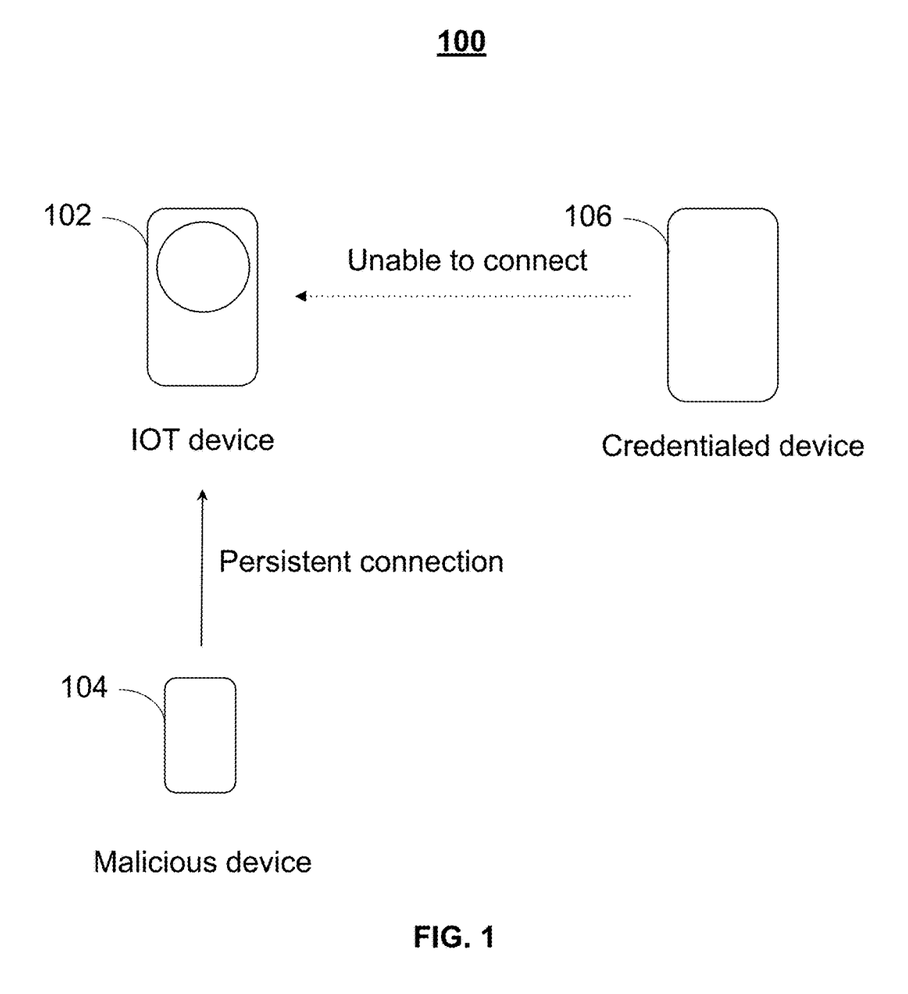
FIG. 1 depicts a system diagram illustrating a DOS attack on an IOT device, in accordance with embodiments of the disclosure.

FIG. 1 shows an illustrative embodiment of a denial of service attack on an IOT device, in accordance with some embodiments of the disclosure. FIG. 1 shows a credentialed device 106, an IOT device 102, and a third-party device 104. For example, the IOT device 102 can be a lock to an apartment, such as a smart lock that can be controlled remotely. The IOT device 102 can be controlled by a network device. The IOT device 102 can have multiple modes of operation. To communicate with the network devices, the IOT devices can operate in a local-area network mode. In the local-area network mode of operation, the IOT device is accessible via various local-area network and/or personal-area network protocols, such as Internet, BLUETOOTH®, ZIGBEE®, NFC, infrared transmission networks, cellular, or other wired or wireless networks. For example, the IOT device can be accessible via a short-range wireless protocol, such as BLUETOOTH®, ZIGBEE®, NFC, infrared. Devices such as credentialed device 106 can control the IOT device 102 when IOT device 102 is operating in the local-area network mode. Before a network device is authorized to control an IOT device 102, the network device must be authenticated by the IOT device 102 using a trusted authentication protocol. In some embodiments, the trusted protocol can include IOT device 102 and the network device exchanging secret keys, for example, private keys, that can be used in decrypting the messages sent between them. An IOT device 102 can classify a network device as a credentialed device 106 when requests received from the credentialed device 106 follow the trusted protocol. In the example described above, the credentialed device 106 can control the IOT device 102 to lock or unlock a door. The process of authenticating a network device as a credentialed device is described in greater detail in Schoenfelder et al., U.S. Pat. No. 9,437,063, issued Sep. 6, 2016, Schoenfelder et al., U.S. Pat. No. 9,666,000, issued May 30, 2017, Schoenfelder et al., U.S. Pat. No. 10,083,559, issued Sep. 25, 2018, and Schoenfelder et al., U.S. Patent Application Publication No. 2018/0336747, filed May 17, 2018, which are hereby incorporated by reference herein in their entireties.

In some embodiments, the IOT device 102 can receive communications from third-party device 104 not via the trusted protocol. The IOT device 102 classifies any request for connection that are not sent via the trusted protocol, as an inauthentic request. When the IOT device 102 receives inauthentic connection requests, the IOT device 102 drops connection with the third-party device 104. In such embodiments, the IOT device 102 can receive multiple non-authentic or malicious connection requests from the third-party device 104. In some embodiments, there can be multiple third-party devices that send the various inauthentic requests to the IOT device 102. The multiple inauthentic requests received can prevent the IOT device 102 from receiving a connection request from credentialed device 106. In the example describe above, multiple inauthentic requests can block a user from locking or unlocking their own door using the credentialed device, thus leaving them trapped. Based on receiving the multiple non-authentic requests from the third-party device 104, IOT device 102 can determine that the third-party device 104 can have malicious intent of compromising the security of the IOT device 102.

Upon determining that the third-party device 104 has malicious intent, the IOT device 102 can switch from the local-area network mode of operation to a DOS mode of operation. In the DOS mode of operation, the IOT device 102 can stop communicating with any network devices and only broadcast an SOS signal. The SOS signal can contain a message that includes information about the suspected malicious attack at the IOT device 102 from the third-party device 104. In some embodiments, the SOS signal broadcasted by the IOT device 102 may be detected by the trusted devices like credentialed device 106. In some embodiments, the credentialed device 102 can be decrypted by software associated with the IOT device 102 installed on the credentialed device 102. In some embodiments, the credentialed device 106 can regain access of the IOT device 102 after decrypting the SOS broadcast signal. Information from the SOS message can be sent via the credentialed device 106 to a server associated with the IOT device 102 to seek assistance. In some embodiments, the information from the SOS message may be sent directly to the server associated with the IOT device 102 if the IOT device has a direct connection to the internet.

Figure 2:
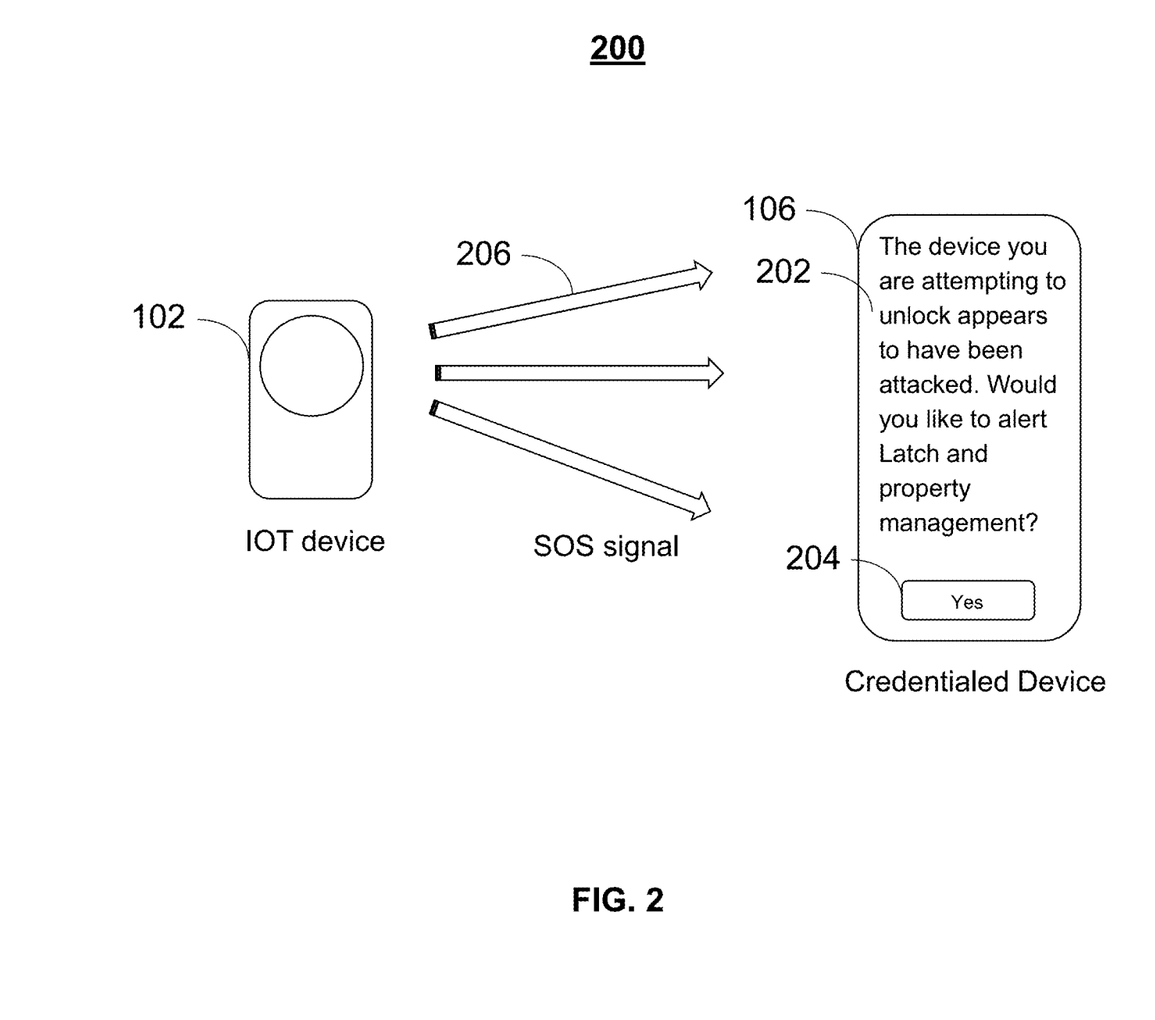
FIG. 2 depicts a system diagram illustrating of a DOS defense of an IOT device, in accordance with embodiments of the disclosure.

FIG. 2 shows an illustrative embodiment of a denial of service defense of an IOT device, after the IOT device has detected a DOS attack, in accordance with some embodiments of the disclosure. FIG. 2 shows the IOT device 102, broadcasting an SOS signal 206, that is decoded by the credentialed device 106. The SOS signal 206 contains SOS message 202 and an option button 204 that are displayed on the credentialed device 106. In some embodiments, the SOS message 202 can inform the user associated with the credentialed device 106 that the IOT device 102 is under attack. In some embodiments, when the IOT device 106 is a lock on a door, the SOS message 202 can also contain an option 204 to allow the user associated with the credentialed device 106 to inform property management or security to investigate the attack on the IOT device 102. The broadcasted SOS signal 206 can only be decoded by credentialed device 102. In some embodiments, the malicious device 104 (not depicted in FIG. 2) can receive the SOS signal 206 but can be unable to decode the SOS signal 206.

The IOT device 102 broadcasts the SOS signal 206 when the mode of operation of the IOT device 102 is switched from the local-area network mode to a DOS mode of operation. As described with respect to FIG. 1, the mode of operation of the IOT device 102 switches from the local-area network mode to the DOS mode when the IOT device 102 determines that the third-party device 104 that is trying to connect with the IOT device 102 has malicious intent and is trying to gain access to the IOT device 102 without using the trusted protocol.

Figure 3:
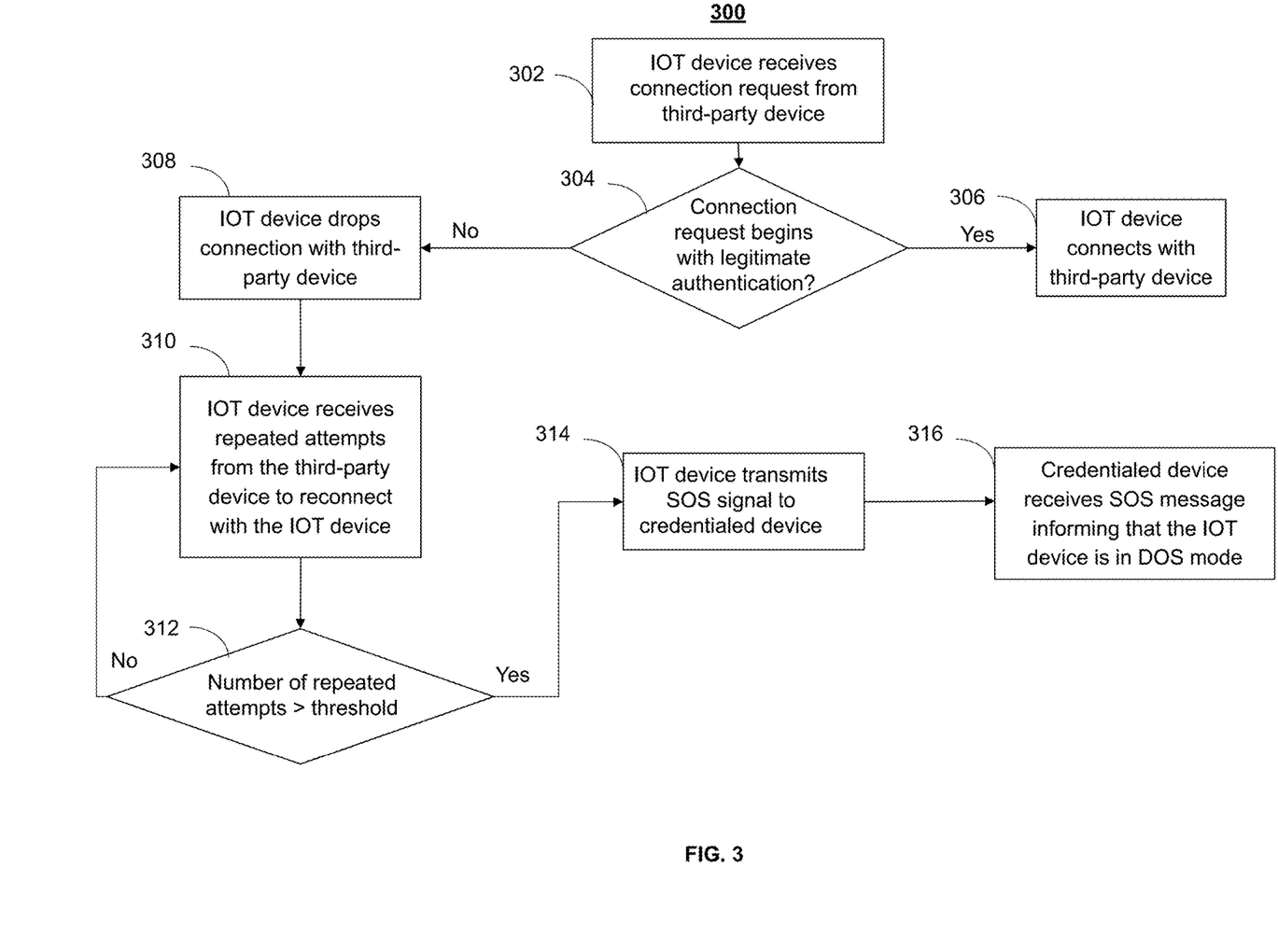
FIG. 3 depicts an illustrative flowchart of a process of a DOS attack on the IOT device, in accordance with embodiments of the disclosure.

FIG. 3 depicts an illustrative flowchart of a process 300 of a denial of service attack on the IOT device and corresponding defense, in accordance with some embodiments of the disclosure.

At 302, an IOT device receives a connection request from a third-party device. The IOT device can be a device like IOT device 102 and third-party device can be a device like third-party device 104. As discussed with respect to FIG. 1, the IOT device 102 receives a connection request from a third-party device. The third-party device can be a credentialed device 106 or a third-party device 104 with malicious intent.

At decision block 304, the IOT device 102 determines whether the connection request begins with a legitimate authentication. Requests not received using a trusted protocol do not initiate a legitimate authentication process with the IOT device 102. In some embodiments, the trusted protocol can include encrypting the connection request that can be only decrypted by the IOT device 102. In case the IOT device 102 determines that connection requests received from the third-party device 104 begins with legitimate authentication, process 300 moves to 306 to connect with the third-party device. In case the IOT device determines that connection requests received from the third-party device 104 does not initiate with legitimate authentication, the process 300 moves to 308 where the IOT device 102 drops the connection with the third-party device 104.

At 310, the IOT device receives repeated attempts from the third-party device to reconnect with the IOT device 102. For example, the IOT device 102 can receive multiple connection requests from the third-party device. None of the multiple connection requests received begin a legitimate authentication, and these repeated connection requests tie up the IOT device 102 so that the IOT device 102 is unable to receive requests from credentialed devices 106.

At decision block 312, the IOT device 102 determines whether the number of attempts from the third-party device 104 to reconnect with IOT device 102 have exceeded a predetermined threshold. In response to determining that the number of attempts of the third-party device 104 to reconnect have not exceeded the predetermined threshold, process 300 moves to 310 and is open to receiving attempts from the third-party device to connect with the IOT device 102. In response to determining that the number of attempts of the third-party device to reconnect with the IOT device 102 has exceeded the predetermined threshold, process 300 moves to 314 where the IOT device 102 enters a DOS mode. The IOS device 102, in the DOS mode, is not accessible via any network to any third-party device 104. The IOT device 102, in the DOS mode, shuts down its local-area network mode, and broadcasts an SOS message. The SOS message can be an encrypted message that can only be decrypted by a credentialed device 106.

At 316, the credentialed device 106 decrypts the broadcasted SOS message. The information contained in the SOS message pertains to the suspected malicious attack at the IOT device 102 from the third-party device 104. Information from the SOS message can be sent via the credentialed device 106 to a server associated with the IOT device 102 to seek assistance.

Figure 4:
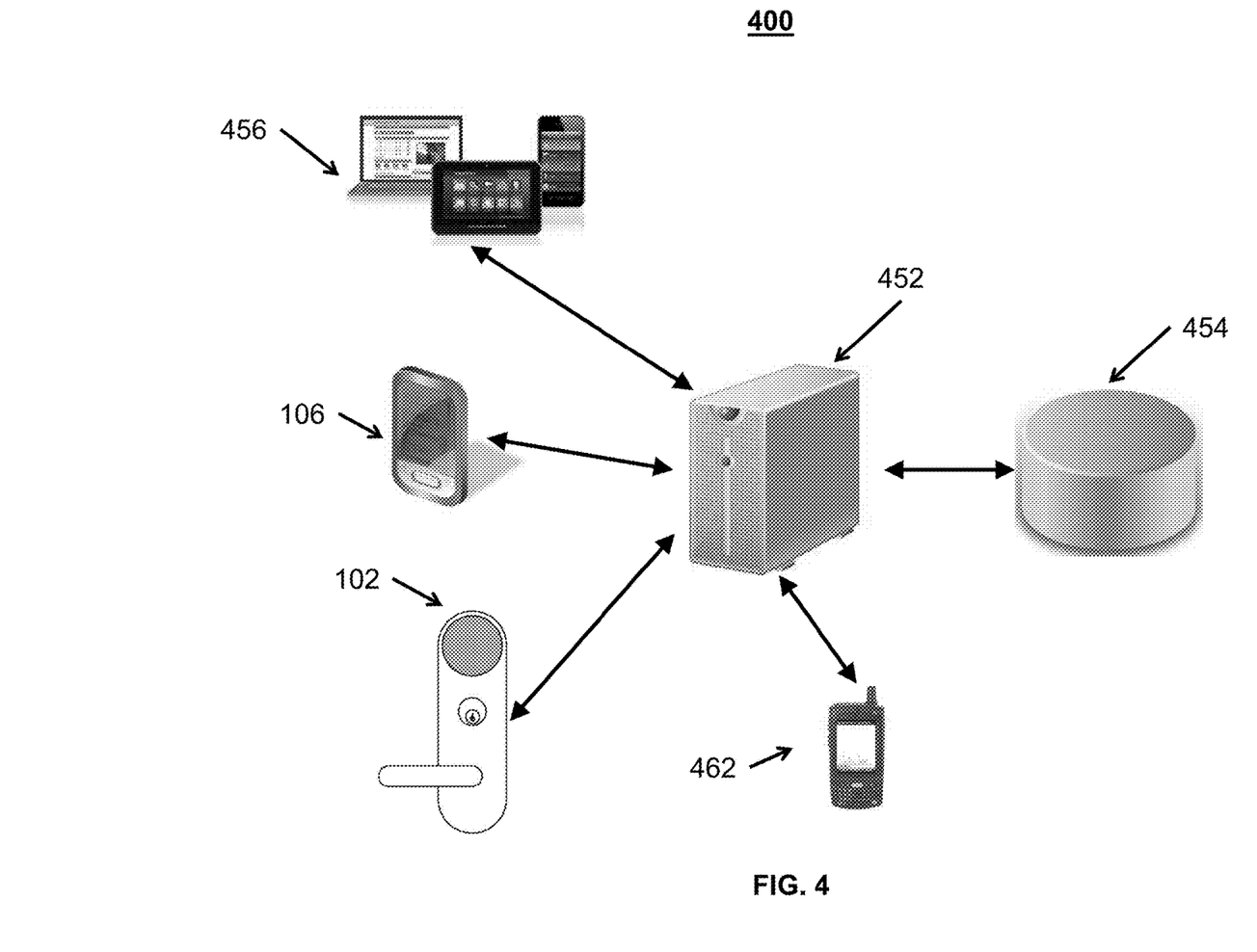
FIG. 4 illustrates an exemplary system architecture for an access control management system, according to embodiments of the present invention.

FIG. 4 illustrates an exemplary system architecture for an access control management system, according to embodiments of the present invention. FIG. 4 shows server 452 in communication with database 454, and also in communication with building manager device 456, credentialed device 106, IOT device 102, and service provider device 462. Server 452 can generate and manage credentials that can be stored in database 454. A building manager using device 456, for example, a computer, tablet, or cell phone, may receive an SOS message from the IOT device 102. The device 456 may be able to decode the SOS signal received from the IOT device 102. In some embodiments, the building manager, upon decoding the SOS message may further secure the IOT device 102 against intruders. In some embodiments, the building manager, upon ascertaining that the IOT device 102 is not under serious threat, may change the mode of operation of the IOT device 102 from the DOS mode to the local-area network mode. In some embodiments, the building manager device 456, may receive the SOS message via the credentialed device 106. In some embodiments, the SOS message may be routed through the server 452.

Persons of ordinary skill would understand that the disclosed systems and methods are enabled by the use of mobile devices and more specifically by the particular characteristics of mobile devices and how people interact with their mobile devices. For example, people carry a mobile device with them all the time. Mobile devices are most of the time turned on and can passively communicate with sensors in their environment without requiring the user's active engagement. Moreover, mobile devices have a wide variety of radio frequency communication capabilities, through built-in hardware, that make them ideal for communicating through different types of communication standards. Mobile devices can install and run applications or apps that enable functionality not available through a web browser operating on a computer, for example, by utilizing the device unique hardware attributes, such as radios, cameras, and secure biometric identifying sensors. In addition, mobile devices can be automatically updated in the background to provide updated secure keys, instructions, and permissions without requiring active user engagement.

According to embodiments of the invention, the local mesh network obviates the need for a persistent internet connection. As discussed above, other prior art approaches require that access control devices are always connected to the internet. In contrast, the disclosed system can link access control devices with mobile devices through a local mesh network. The mobile devices can provide a bridge to the internet for the entire mesh network. This allows operation of the access control system at low cost and with minimal power requirements, compared, for example, to a system that requires a persistent internet connection to operate and update the access control devices. In the described system, the access control devices can be connected to each other and the system can utilize the handshakes performed between user devices and access control devices to pass any system updates to the access control devices. User devices typically have internet connections and sufficient capacity to passively pass system update packets through the required handshake procedures with the installed access control hardware. Therefore, there is no additional requirement for a persistent internet connection installation just for the access control devices.

Figure 5:
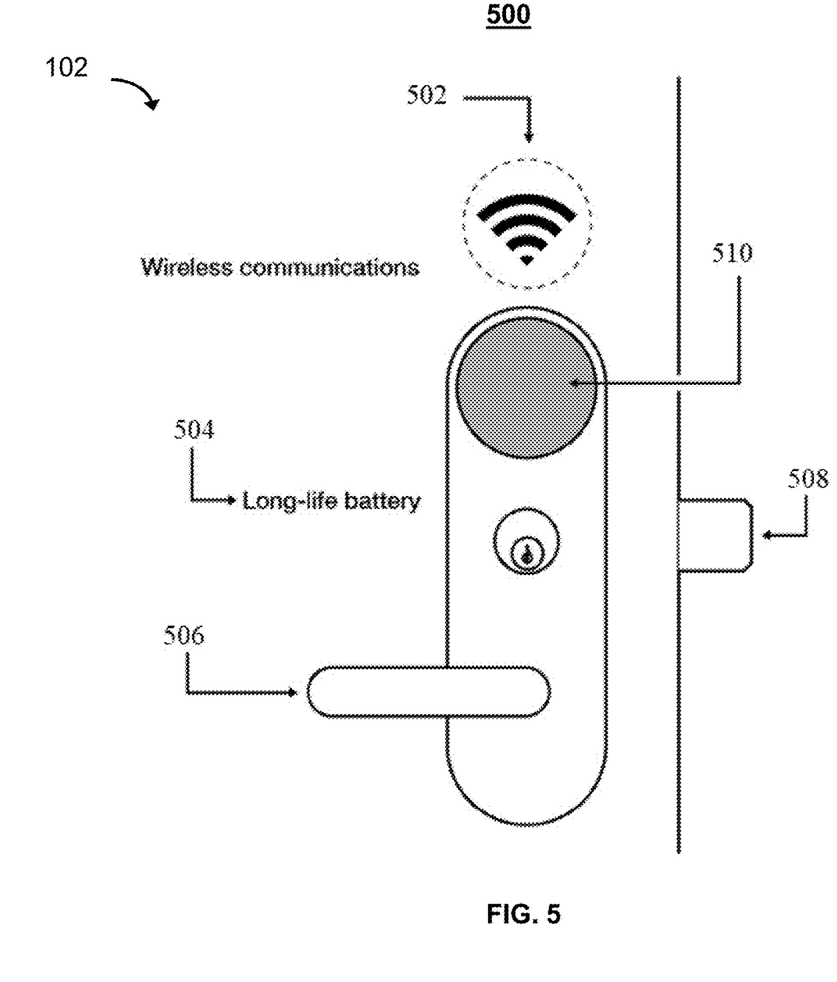
FIG. 5 illustrates an exemplary IOT device, according to embodiments of the present invention.

FIG. 5 illustrates an exemplary IOT device, according to embodiments of the present invention. Specifically, IOT device 102 can include a wireless communications module 502 configured to communicate with user mobile devices and other access control devices in its proximity, through a wireless transmitter and a wireless receiver. The communication from the user device can relate to granting the user of the mobile device access to a particular area or unit. In addition, the communication from the user device and other access control devices can also relate to system updates. IOT device 102 can also include a long-life battery 504 and a handle 506 to move latch 508 and unlock the door's passage lock, deadbolt, or other locking mechanisms, for example, to a user's unit. IOT device 102 can also include a digital display 510 to provide the user with information. Persons of skill in the art would understand that the access control device of FIG. 5 is for illustration purposes only and that other types of access control devices can be used.

According to aspects of the invention, each access control device can have a unique identification (ID) that can identify them in the system. For example, the access control IDs can be based on the MAC address of the access control device radio. Server 452 can maintain a table of cryptographic keys that can be indexed by the access control device ID. Each credential associated with an access control device ID can be configured during installation into the appropriate lock. When access to a lock is requested, the appropriate credential is transmitted securely to an application running on a mobile device, for example, using a secure transport such as SSL/TLS and can be stored in the mobile device. The credential can be used to generate an authenticated unlock request, for example using an unlock protocol. When a user requests credentials from the server, for example, for a guest or a service provider, the server can determine the appropriate credential to send to the guest or service provider. The server determines the appropriate credential based on the authenticated user who is requesting them. For example, the user can be authenticated in the system through user account authentication, e.g., by providing user details when setting up an account with the system.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local-area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, can readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter can be made without departing from the spirit and scope of the disclosed subject matter, which is limited only by the claims which follow.

What is claimed is:

1. A method for protecting a device from a denial of service (DOS) attack, the method comprising:
   receiving, by the device, a connection request from a third-party device over a short-range wireless protocol;
   determining, by the device, that the third-party device is malicious;
   switching a mode of operation of the device from a first mode to a second mode, in response to determining that the third-party device is malicious, wherein in the second mode of operation the device is not wirelessly accessible; and
   broadcasting, by the device in the second mode, an encrypted message configured to be decrypted by a credentialed device, and is not decryptable by the third-party device wherein the credentialed device is configured to regain access to the device based on the credentialed device decrypting the encrypted message.

2. The method of claim 1, wherein determining that the third-party device is malicious further comprises:
   determining, by the device, whether the connection request from the third-party device initiates a legitimate authentication; and dropping, by the device, a connection with the third-party device in response to determining that the connection request does not initiate the legitimate authentication.

3. The method of claim 2, further comprising:
determining, by the device, that a number of connection attempts by the third-party device has exceeded a threshold; and
determining that the third-party device is malicious, when the number of connection attempts has exceeded the threshold.

4. The method of claim 1, wherein the device is accessible in the first mode of operation over a personal area network implemented over one of a short-range wireless protocol, an infrared protocol, or a combination thereof.

5. The method of claim 4, wherein in the second mode of operation the device is not accessible over the personal area network and is configured to broadcast only the encrypted message.

6. The method of claim 1, wherein the device is an internet-of-things (IOT) device.

7. The method of claim 6, wherein the IOT device is an access control device configured to control access to a building.

8. The method of claim 1, wherein the credentialed device is a mobile device configured to receive credentials from the device to enable the credentialed device to provide access to a building.

9. A system for protecting devices from denial of service attacks, the system comprising:
a device of the devices comprising a wireless transceiver and a wireless transmitter configured to:
receive a connection request from a third-party device over a short-range wireless protocol;
determine that the third-party device is malicious;
switch from a first mode of operation to a second mode of operation, in response to determining that the third-party device is malicious, wherein in the second mode of operation the device is not wirelessly accessible; and
broadcast, in the second mode, an encrypted message to one or more credentialed devices, the encrypted message configured to be decryptable by the one or more credentialed devices, and is not decryptable by the third-party device; and
a credentialed device of the one or more credentialed devices is configured to decrypt the encrypted message from the device, and wherein the credentialed device is configured to regain access to the device based on the credentialed device decrypting the encrypted message.

10. The system of claim 9, wherein the device is further configured to:
determine whether the connection request from the third-party device initiates a legitimate authentication; and
drop a connection with the third-party device in response to determining that the connection request does not initiate the legitimate authentication.

11. The system of claim 10, wherein the device is further configured to:
determine that a number of connection attempts by the third-party device has exceeded a threshold; and
determine that the third-party device is malicious, when the number of connection attempts has exceeded the threshold.

12. The system of claim 9, wherein the device is accessible in the first mode of operation over a personal area network implemented over one of the short-range wireless protocol, an infrared protocol, or a combination thereof, and wherein in the second mode of operation the device is not accessible over the personal area network and is configured to broadcast only the encrypted message.

13. The system of claim 9, wherein the credentialed device is configured to:
decrypt the encrypted message; and
send an indication of a denial of service attack to a server based on information in the encrypted message.

14. The system of claim 9, wherein the device is an internet-of-things (IOT) device.

15. The system of claim 14, wherein the TOT device is an access control device, that is used to control access to a building.

16. The system of claim 9, wherein the device is further configured to send credentials to the credentialed device to enable the credentialed device to provide access to a building.

17. A device, comprising a wireless transceiver and a wireless transmitter configured to:
receive a connection request from a third-party device over a short-range wireless protocol;
determine that the third-party device is malicious;
switch from a first mode of operation to a second mode of operation, in response to determining that the third-party device is malicious, wherein in the second mode of operation the device is not wirelessly accessible; and
broadcast, in the second mode, an encrypted message configured to be decrypted by a credentialed device, the encrypted message comprising an indication the third-party device is malicious, and wherein the credentialed device is configured to regain access to the device based on the credentialed device decrypting the encrypted message.

18. The device of claim 17, wherein the device is further configured to:
determine whether the connection request from the third-party device initiates a legitimate authentication; and
drop a connection with the third-party device in response to determining that the connection request does not initiate the legitimate authentication.

19. The device of claim 18, wherein the device is further configured to:
determine that a number of connection attempts by the third-party device has exceeded a threshold; and
determine that the third-party device is malicious, when the number of connection attempts has exceeded the threshold.

20. The device of claim 17, wherein the device is accessible in the first mode of operation over a personal area network implemented over one of the short-range wireless protocol, an infrared protocol, or a combination thereof and wherein in the second mode of operation the device is not accessible over the personal area network and is configured to broadcast only the encrypted message.

* * * * *